April 8, 1924.  M. MUCZKA  1,489,895
PLOW
Filed July 6, 1921   2 Sheets-Sheet 1
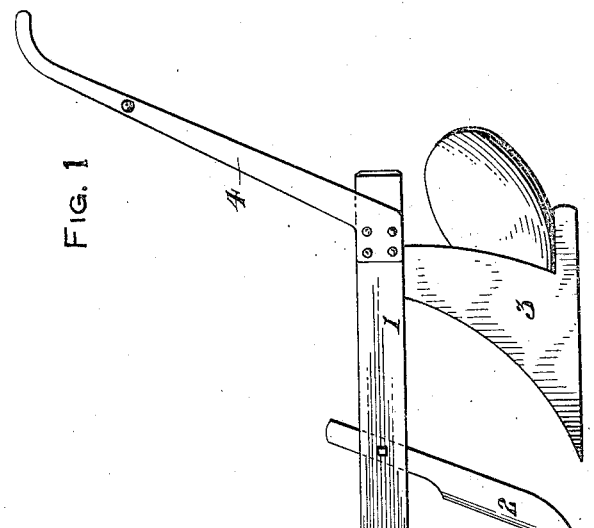
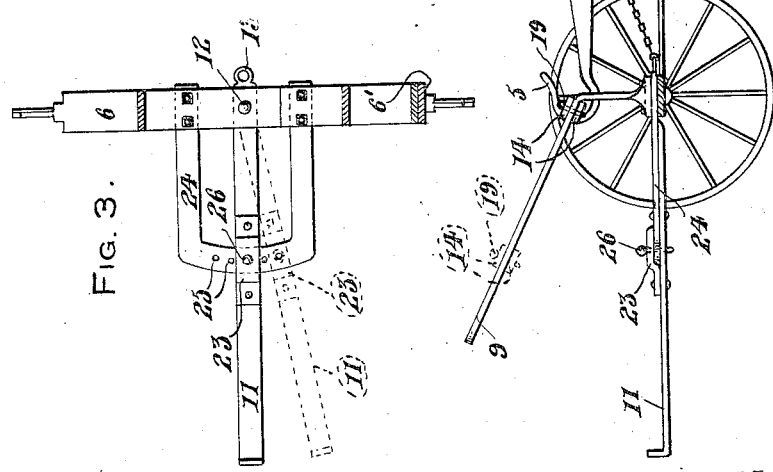
Inventor
M. Muczka
By
Attorney April 8, 1924.
M. MUCZKA
PLOW
Filed July 6, 1921   2 Sheets-Sheet 2
1,489,895
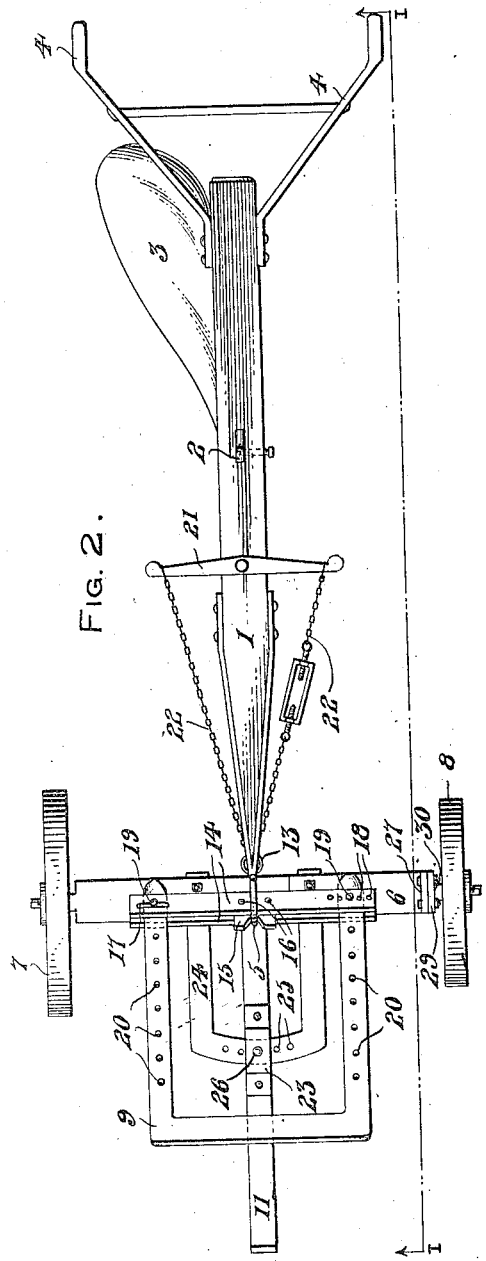
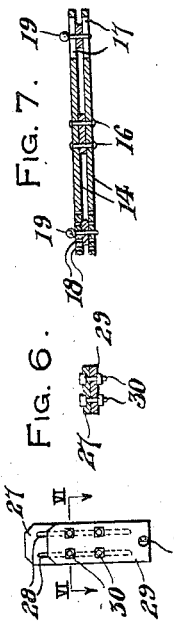
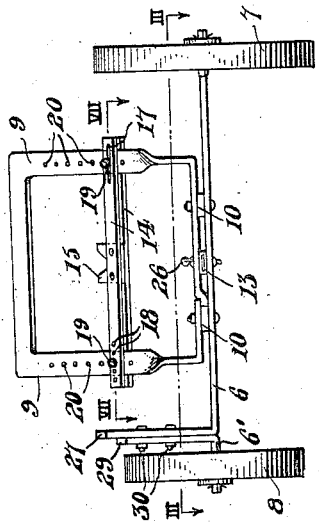
Inventor
M. Muczka Patented Apr. 8, 1924.

1,489,895

UNITED STATES PATENT OFFICE.

MAKIJ MUCZKA, OF LIVERMORE, PENNSYLVANIA.

PLOW.

Application filed July 6, 1921. Serial No. 482,672.

*To all whom it may concern:*

Be it known that I, MAKIJ MUCZKA, a citizen of Ukraine, residing at Livermore, in the county of Westmoreland and State of Pennsylvania, have invented certain new and useful Improvements in Plows, of which the following is a specification.

This invention relates to certain new and useful improvements in plows and has for one of its objects to provide a plow having the forward end of the beam section thereof adjustably connected to a frame for varying the angularity of the plow share to control the depth of cut thereof.

A further object of the invention is to provide a plow having the forward end of the beam section connected to a wheel frame with the draft rod of the wheel frame angularly adjustable to cause the plow to travel in an arcuate path.

A still further object of the invention is to provide an adjustable side wheel for the plow carriage to accommodate the rolling of the larger wheel within furrows of different depths.

With the above general objects in view and others that will appear as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a longitudinal sectional view taken on line I—I of Fig. 2 showing the plow and beam connected to a wheeled carriage, Figure 2 is a top plan view of the same, Figure 3 is a horizontal sectional view taken on line III—III of Fig. 4 showing the adjustable draft rod connection for the wheeled carriage frame.

Figure 4 is a rear elevational view of the wheeled carriage frame showing the vertically adjustable cross bar for supporting the forward end of the plow beam, Figure 5 is a detail side elevational view of the adjustable mounting for the small wheel of the carriage, Figure 6 is a detail sectional view taken on line IV—IV of Fig. 5, and Figure 7 is a detail sectional view taken on line VII—VII of Fig. 4 showing the adjustable cross bar for supporting the forward end of the plow beam.

Referring more in detail to the accompanying drawings there is illustrated a plow wherein the beam 1 carrying a colter 2 intermediate the ends thereof has a plow 3 secured to the rear end with the handle bars 4 upwardly and rearwardly projecting from the rear end of the plow beam. The forward end of the plow beam is provided with an upwardly and rearwardly directed hook 5 for purposes presently to appear.

The wheeled carriage associated with the forward end of the plow beam 1 embodies an axle bar 6 having relatively large and small ground wheels 7 and 8 respectively journaled at opposite ends thereof. A rectangular frame bar embodying side sections 9 is secured as at 10 to the axle bar 6 and a draft rod 11 is pivoted as at 12 to the axle bar 6 and carries at its rear end an eye 13.

A pair of cross bars 14 has a notch block 15 secured therebetween midway the ends thereof by bolts 16, the ends of the cross bars 14 enclosing the side section 9 of the rectangular frame, one pair of adjacent ends of the cross bars being slotted as at 17 while the other pair of adjacent ends are provided with a plurality of alined openings 18. Pins 19 extend through the slots 17 and openings 18 and are selectively positioned in spaced openings 20 in the side sections 9 of the rectangular frame, this connection providing for a vertical adjustment of the cross bars 14. The hook 5 at the forward end of the plow beam 1 is engaged with the notched plate 15 of the cross bars and by shifting the cross bars upon the side sections 9 of the rectangular frame, angularity of the plow 3 is changed.

A further draft connection between the wheeled carriage and the plow frame embodies a cross arm 21 carried by the plow beam and having chain connections 22 with the eye 13 upon the rear end of the draft rod 11.

To cause the plow to travel in an arcuate path the draft rod 11 carries a strap 23 having an upwardly arched central portion that is slidably received on the frame bar 24 having a series of openings 25 in the forward cross arm thereof as shown in Figs. 2 and 3, while a pin 26 passing through an opening in the strap and draft rod is selectively received in the openings 25 to vary the angularity of the draft rod with respect to the axle bar 6.

The small wheel 8 is adjustably connected to the axle bar 6 to accommodate the wheeled carriage travelling in furrows of different depths, the end of the axle bar adjacent the wheel 8 carrying an upwardly directed arm 27 slotted as at 28 while the stub axle 6′ for the wheel 8 carries a perpendicular extension 29 with screw bolts 30 passing therethrough and adjustably secured in the slots 28, thereby rendering the ground wheel 8 capable of vertical adjustments.

From the above detailed description of the device it is thought that the construction and operation thereof will at once be apparent, it being noted that the angularity of the plow 3 may be controlled by shifting the cross bars 14 on the rectangular frame bars 9, while the lateral adjustment of the plow is accomplished by transverse shifting of the frame bars on the rectangular frame as shown in Figs. 4 and 7. To cause the plow to travel in an arcuate path the draft rod 9 may be laterally shifted in either direction while the adjustable mounting for the wheel 8 permits the wheeled carriage to travel in furrows of various depths.

What is claimed as new is:—

A plow of the type described comprising a beam, a plow carried by the beam, a hook carried by the forward end of the beam, a wheeled carriage embodying an axle bar, a perpendicular rectangular frame carried by the axle bar and having a forwardly and upwardly inclined extension, a cross bar adjustably mounted on the side bars of the rectangular frame, a notch plate carried by the cross bar engaged by the beam hook for pivotally connecting the plow beam to the wheeled carriage and centering the same, and a draft rod for the axle bar.

In testimony whereof I affix my signature

MAKIJ MUCZKA.